(12) United States Patent
Bull et al.

(10) Patent No.: US 11,073,907 B1
(45) Date of Patent: Jul. 27, 2021

(54) SYSTEM AND METHOD OF ADJUSTING OF AN ENVIRONMENT ASSOCIATED WITH A USER

(71) Applicant: Dell Products L.P., Round Rock, TX (US)

(72) Inventors: Spencer G. Bull, Cedar Park, TX (US); Tyler Ryan Cox, Austin, TX (US); Michiel Sebastiaan Emanuel Petrus Knoppert, Amsterdam (NL); Michael S. Gatson, Austin, TX (US); Vivek Viswanathan Iyer, Austin, TX (US); Jake Mitchell Leland, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 16 days.

(21) Appl. No.: 16/774,491

(22) Filed: Jan. 28, 2020

(51) Int. Cl.
*G06F 3/01* (2006.01)
*G06F 9/451* (2018.01)

(52) U.S. Cl.
CPC .............. *G06F 3/013* (2013.01); *G06F 9/453* (2018.02)

(58) Field of Classification Search
CPC ................................. G06F 3/013; G06F 9/453
USPC .......................................................... 382/117
See application file for complete search history.

(56) References Cited

U.S. PATENT DOCUMENTS

| 8,982,046 B2* | 3/2015 | Edwards | G06K 9/00604 345/156 |
| 2009/0141895 A1* | 6/2009 | Anderson | G06F 21/60 380/252 |
| 2011/0081634 A1* | 4/2011 | Kurata | G06N 5/02 434/236 |
| 2014/0310256 A1* | 10/2014 | Olsson | G06F 16/436 707/706 |
| 2016/0048964 A1* | 2/2016 | Kruglick | G06K 9/00671 345/633 |
| 2016/0313822 A1* | 10/2016 | Krishnakumar | G06F 3/04186 |
| 2020/0050265 A1* | 2/2020 | Krishnakumar | G06F 3/013 |
| 2020/0218935 A1* | 7/2020 | Abe | G06K 9/6278 |

* cited by examiner

Primary Examiner — Gabriel I Garcia
(74) Attorney, Agent, or Firm — Baker Botts L.L.P.

(57) ABSTRACT

In one or more embodiments, one or more systems, methods, and/or processes may: determine multiple gaze vectors of a user viewing content of a foreground application displayed via a display; determine a pattern based at least on the multiple gaze vectors; determine if the pattern is a search pattern, a static pattern, or a reading pattern; if not so, make a first adjustment of an environment associated with the user; if so, determine if the foreground application is a productivity application; if not so, make the first adjustment of the environment associated with the user; if so, determine if the content of the foreground application is classified as productive; if not so, make the first adjustment of the environment associated with the user; and if so, make a second adjustment of the environment associated with the user, different from the first adjustment of the environment associated with the user.

20 Claims, 8 Drawing Sheets

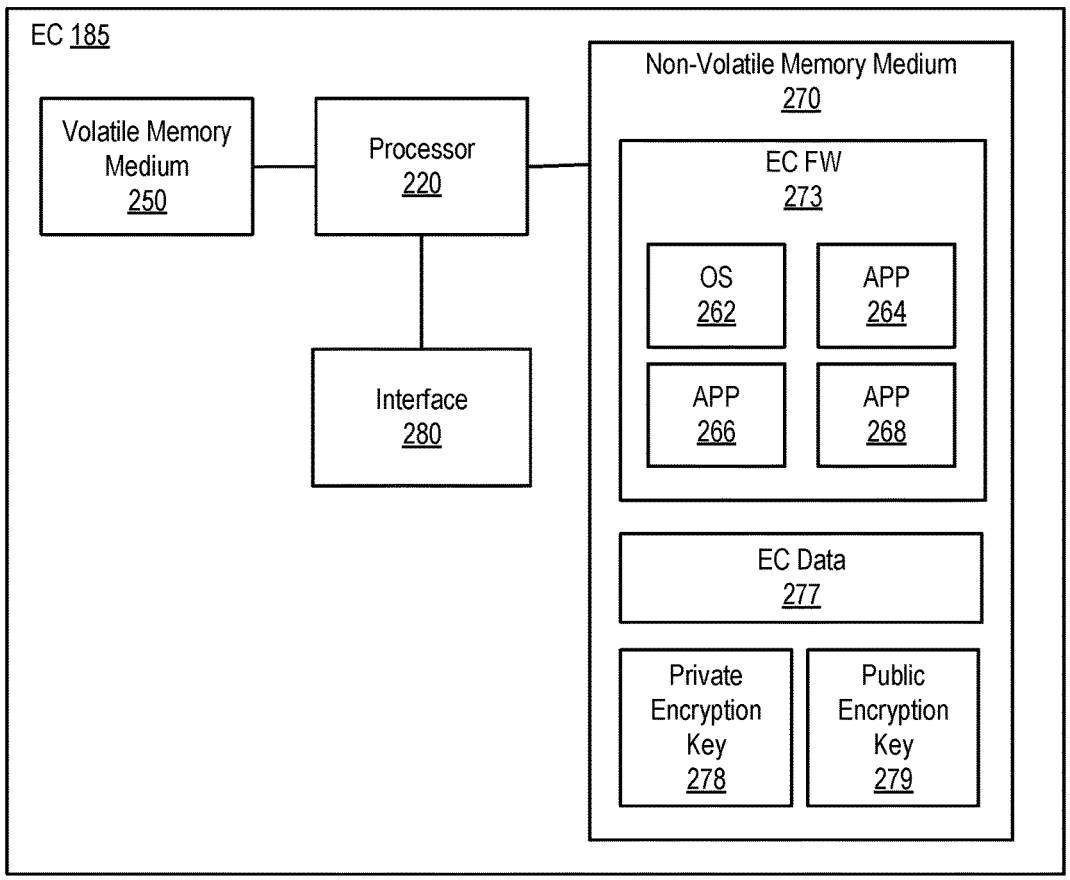
FIG. 2
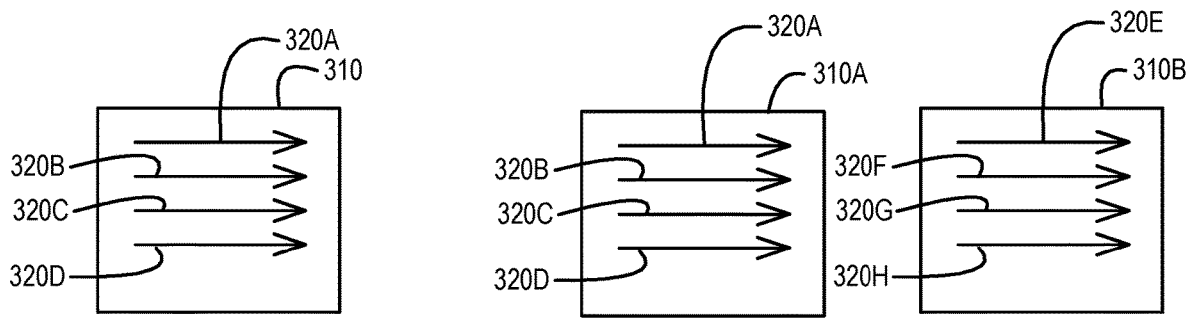
FIG. 3A  FIG. 3B

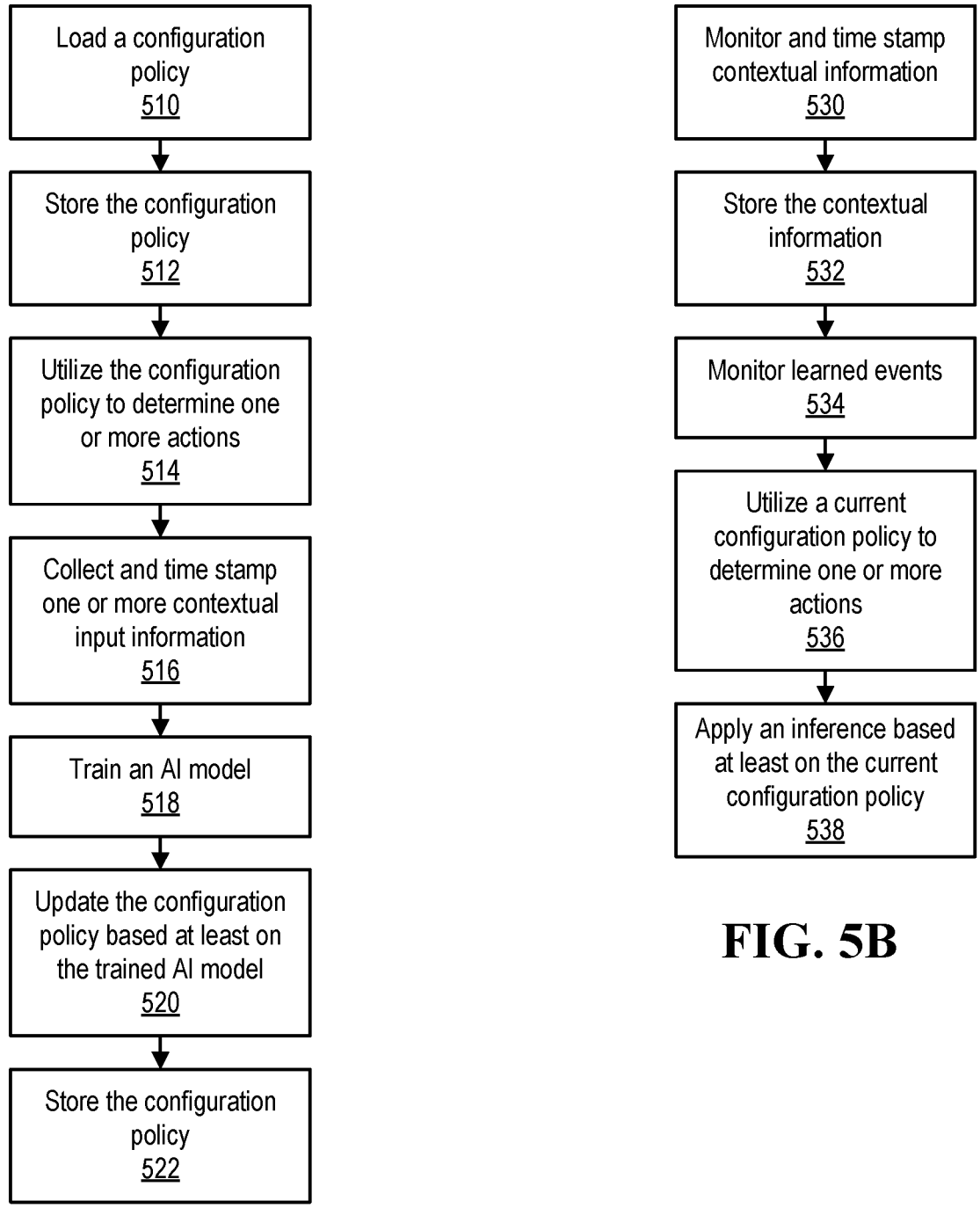

SYSTEM AND METHOD OF ADJUSTING OF AN ENVIRONMENT ASSOCIATED WITH A USER

BACKGROUND

Field of the Disclosure

This disclosure relates generally to information handling systems and more particularly to adjusting of an environment associated with a user.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may determine multiple gaze vectors of a user viewing content of a foreground application displayed via a display; may determine a pattern based at least on the multiple gaze vectors; may determine if the pattern is a search pattern, a static pattern, or a reading pattern; if the pattern is not the search pattern, the static pattern, or the reading pattern, may make a first adjustment of an environment associated with the user; if the pattern is the search pattern, the static pattern, or the reading pattern, may determine if the foreground application is a productivity application; if the foreground application is not the productivity application, may make the first adjustment of the environment associated with the user; if the foreground application is the productivity application, may determine if the content of the foreground application is classified as productive; if the content of the foreground application is not classified as productive, may make the first adjustment of the environment associated with the user; and if the content of the foreground application is classified as productive, may make a second adjustment of the environment associated with the user, different from the first adjustment of the environment associated with the user.

In one or more embodiments, the one or more systems, the one or more methods, and/or the one or more processes may further, if the content of the foreground application is classified as productive, determine that the user is in a micro focus session. For example, making the second adjustment of the environment associated with the user may be performed in response to determining that the user is in the micro focus session. In one or more embodiments, making the second adjustment of the environment associated with the user may include suspending notifications to the user.

In one or more embodiments, making the second adjustment of the environment associated with the user may include providing light emissions that indicate that the user is not to be interrupted. For example, a light emitting device may provide the light emissions that indicate that the user is not to be interrupted. In one or more embodiments, determining the pattern based at least on the multiple gaze vectors may include an artificial intelligence model determining the pattern based at least on the plurality of gaze vectors. For example, the one or more systems, the one or more methods, and/or the one or more processes may utilize an artificial intelligence model to determine the pattern based at least on the plurality of gaze vectors.

In one or more embodiments, the artificial intelligence model may provide at least one output probability. In one or more embodiments, the one or more systems, the one or more methods, and/or the one or more processes may further determine that the at least one output probability is greater than or equal to a threshold probability. For example, making the second adjustment of the environment associated with the user may be performed in response to determining that the at least one output probability is greater than or equal to the threshold probability. In one or more embodiments, determining the multiple gaze vectors may include an eye tracking device tracking multiple movements of an eye of the user.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which:

FIG. 2 illustrates an example of an embedded controller, according to one or more embodiments;

FIG. 3A illustrates an example of gaze tracking vectors associated with a display, according to one or more embodiments;

FIG. 3B illustrates an example of gaze tracking vectors associated with multiple displays, according to one or more embodiments;

FIG. 5A illustrates a method of calibrating a service, according to one or more embodiments;

FIG. 5B illustrates a method of utilizing a service, according to one or more embodiments;

DETAILED DESCRIPTION

Figure 1:
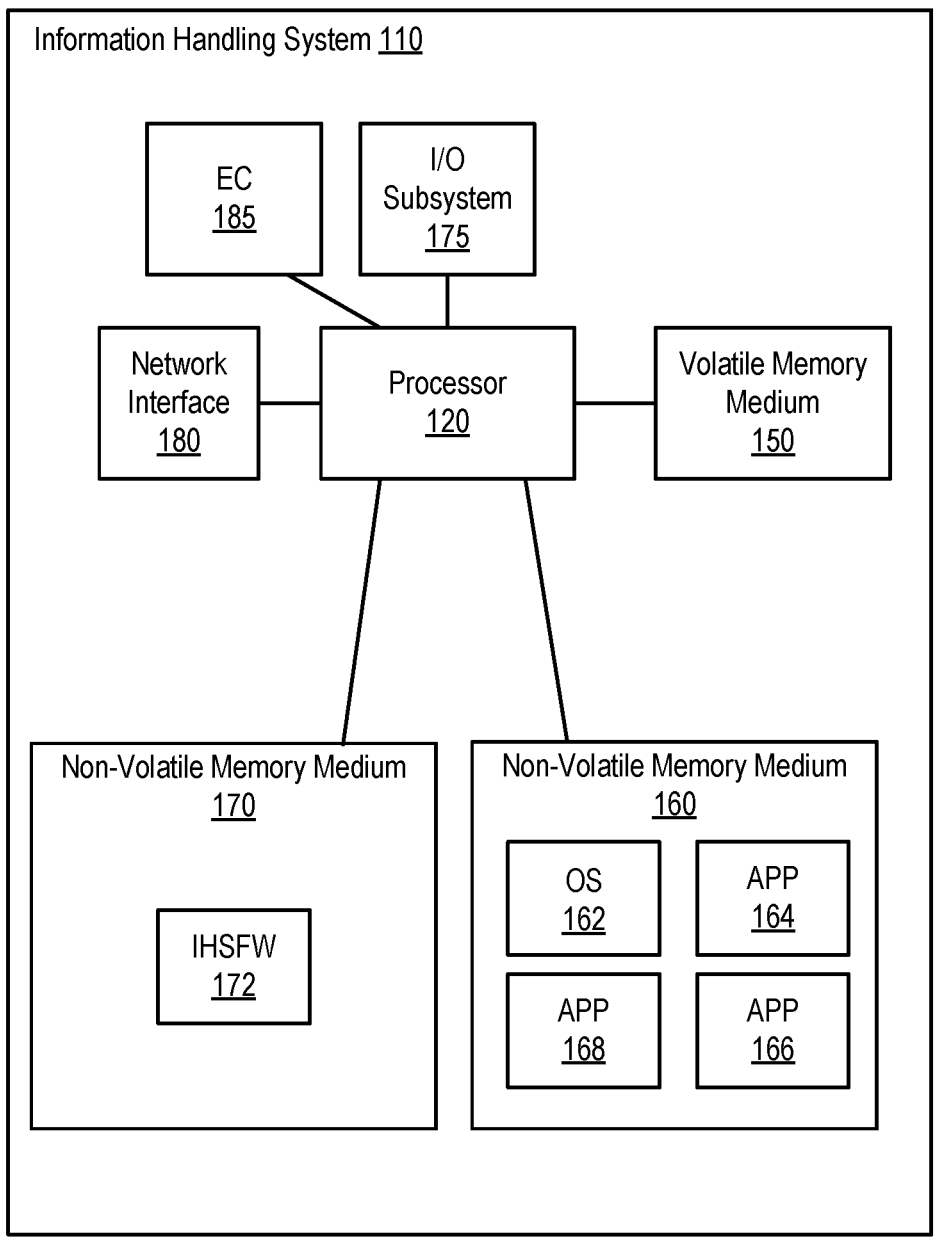
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

User productivity may suffer from one or more sources of interruption in an environment. For example, the environment may include an office environment. In one or more embodiments, a flow state may configure one or more user systems to suppress the one or more sources of interruption. For example, a flow state may configure one or more user systems to suppress the one or more sources of interruption until user productivity is not impacted. In one or more embodiments, a focus assistant may be utilized to suppress the one or more sources of interruption. In one example, a user may user toggle the focus assistant on and off. In a second example, a user may schedule the focus assistant on for a period of time. In another example, a user may schedule the focus assistant off for a period of time. In one or more embodiments, a user focus may be granular. For example, a user focus may not adhere to a schedule. For instance, a user focus may not occur as a planned activity. In one or more embodiments, one or more systems, one or more methods, and/or one or more processes described herein may at least aid in establishing a flow state for a user. In one or more embodiments, a micro focus may include one or more brief productivity sessions where a task may be completed. In one example, a micro focus session may include reading an article on a website. In a second example, a micro focus session may include comparing documents. In another example, a micro focus session may include searching for content displayed by a display.

In one or more embodiments, a user session may begin, and a gaze vector, associated with where a user is looking, may be determined. For example, the gaze vector may be determined via one or more eye tracking systems, one or more eye tracking methods, and/or one or more eye tracking methods. In one or more embodiments, the gaze vector may be mapped to an area of a display. In one or more embodiments, a cache of gaze vectors may be utilized to determine direction of a gaze of a user over a period of time. In one or more embodiments, a pattern may be determined from the gaze vectors. For example, a pattern classifier may be utilized in determining the pattern from the gaze vectors. For instance, the pattern classifier may include an artificial intelligence (AI) model (e.g., a machine learning model, a neural network model, etc.). In one or more embodiments, a pattern may include a reading pattern, a reference pattern, a skimming pattern, a browsing pattern, a chaotic search pattern, a static pattern, a productivity pattern, an inattentive pattern, or an unknown pattern, among others. In one or more embodiments, a pattern may be a micro focus pattern. For example, one or more patterns may be classified as a micro focus pattern.

In one or more embodiments, if a pattern is a micro focus pattern, it may be determined if a user is focused on productivity content. In one example, the user may be focused on content that may be productive. For instance, the user may be focused on content that may be productive for the user, for an employer of the user, etc. In another example, the user may be focused on content that may not be productive. For instance, the user may be focused on content that may not be productive for the user, for an employer of the user, etc.

In one or more embodiments, determining if the user is focused on productivity content may include determining an identification of a foreground application. In one example, if a list of productivity application identifications does not include the identification of the foreground application, it may be determined that the user is not engaged in a micro focus session. In another example, if the list of productivity application identifications includes the identification of the foreground application, it may be determined if content displayed by the foreground application is classified as productive. If the content displayed by the foreground application is not classified as productive, it may be determined that the user is not engaged in a micro focus session. If the content displayed by the foreground application is classified as productive, it may be determined that the user is engaged in a micro focus session. In one or more embodiments, if the user is engaged in a micro focus session, one or more systems, one or more methods, and/or one or more processes described herein may aid in preserving the micro focus session of the user and/or may aid in preventing or mitigating an interruption of the user while the user is in the micro focus session.

In one or more embodiments, an immersive environment may be created for a user. For example, the immersive environment, which may be created for the user, may allow the user to remain in a workflow. In one or more embodiments, the immersive environment, which may be created for the user, may eliminate or mitigate distractions of the user. For example, the immersive environment may provide assistance to the user on one or more tasks and/or augment capabilities to improve productivity of the user. In one or more embodiments, the immersive environment, which may eliminate or mitigate distractions, may include block interruptions such as notifications and alerts, among others. For example, the immersive environment may provide one or more notifications to others, such as do not disturb notifications, etc.

In one or more embodiments, the immersive environment may assist the user. For example, assisting the user may include providing contextually driven actions based at least on one or more current tasks of the user and/or may include providing performance enhancements based at least on the one or more current tasks of the user. In one or more embodiments, keeping a user in focused mode may include preventing or mitigating distractions. For example, it may be advantageous to detect when a user is in a reading mode (e.g., reading content) and to adjust an environment associated with the user. For instance, the environment associated with the user may be adjusted in an effort to allow the user to continue with the reading mode.

As an example, a user may be in a cubical of the user. A lid of a laptop information handling system, of the user, may be closed. The laptop information handling system may be coupled to multiple displays. For instance, the user may be reading content displayed via a web browser, displayed via a first display of the multiple displays. In one instance, the user may read content at a zoom of 120%, and may utilize a peripheral sensitivity level to scroll the content, and may utilize a display brightness level less than a normal brightness level while reading content that includes a white background color. As another example, the user may utilize the laptop information handling system at a coffee shop. In one instance, the user may read content at a zoom of 150% while utilizing the laptop information handling system at the coffee shop. In another instance, the user may engage a privacy mode while utilizing the laptop information handling system at the coffee shop.

In one or more embodiments, one or more of modes of utilizing the laptop information handling system of the user may be determined. For example, data associated with how the user utilizes the laptop information handling system of the user. In one or more embodiments, an artificial intelligence may be trained with the data associated with how the user utilizes the laptop information handling system of the user. In one example, a neural network model may be trained with the data. In another example, a machine learning model may be trained with the data. In one or more embodiments, a cloud-based computational solution may be utilized to train the neural network model or the machine learning model. For example, the neural network model or the machine learning model may be provided to the laptop information handling system after the neural network model or the machine learning model is trained.

In one or more embodiments, based at least on sensors associate with the laptop information handling system of the user and/or based at least on a time of day, a zoom level and/or a brightness level may be adjusted. For example, the trained artificial intelligence may adjust receive data from the sensors associate with the laptop information handling system of the user and/or may receive data that includes a current time. For instance, the trained artificial intelligence may adjust the zoom level and/or the brightness level based at least on the data from the sensors associate with the laptop information handling system of the user and/or based at least on the data that include the current time of day.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, and an embedded controller (EC) 185. As illustrated, volatile memory medium 150, non-volatile memory media 160 and 170, I/O subsystem 175, network interface 180, and EC 185 may be communicatively coupled to processor 120.

In one or more embodiments, one or more of volatile memory medium 150, non-volatile memory media 160 and 170, I/O subsystem 175, network interface 180, and EC 185 may be communicatively coupled to processor 120 via one or more buses, one or more switches, and/or one or more root complexes, among others. In one example, one or more of volatile memory medium 150, non-volatile memory media 160 and 170, I/O subsystem 175, network interface 180, and EC 185 may be communicatively coupled to processor 120 via one or more PCI-Express (PCIe) root complexes. In another example, one or more of volatile memory medium 150, non-volatile memory media 160 and 170, I/O subsystem 175, network interface 180, and EC 185 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RANI (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150, 160, and 170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

In one or more embodiments, EC 185 may be or include a remote access controller. For example, the remote access controller may be or include a Dell Remote Access Controller (DRAC). In one or more embodiments, a remote access controller may be integrated into IHS 110. For example, the remote access controller may be or include an integrated Dell Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, EC 185 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 185 may be or include an application processor. In one example, EC 185 may be or include an ARM Cortex-A processor.

In another example, EC 185 may be or include an Intel Atom processor. In one or more embodiments, EC 185 may be or include one or more of a field programmable gate array (FPGA) and an ASIC, among others, configured, coded, and/or encoded with instructions in accordance with at least a portion of one or more of systems, one or more flowcharts, one or more methods, and/or one or more processes described herein.

Turning now to FIG. 2, an example of an embedded controller is illustrated, according to one or more embodiments. As shown, EC 185 may include a processor 220, a volatile memory medium 250, a non-volatile memory medium 270, and an interface 280. As illustrated, non-volatile memory medium 270 may include a EC firmware (FW) 273, which may include an OS 262 and APPs 264-268, and may include EC data 277. In one example, OS 262 may be or include a real-time operating system (RTOS). In a second example, OS 262 may be or include an Unix-like operating system. For instance, the Unix-like operating system may be or include Linux, FreeBSD, NetBSD, OpenBSD, Minix, Xinu, or Darwin, among others. In another example, OS 262 may be or include a portable operating system interface (POSIX) compliant operating system. As illustrated, non-volatile memory medium 270 may include a private encryption key 278. As shown, non-volatile memory medium 270 may include a public encryption key 279. In one or more embodiments, private encryption key 278 and public encryption key 279 may be asymmetric encryption keys. In one example, data encrypted via private encryption key 278 may be decrypted via public encryption key 279. In another example, data encrypted via public encryption key 279 may be decrypted via private encryption key 278.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable EC 185 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, one or more flowcharts, one or more methods, and/or one or more processes described herein. For example, non-volatile memory medium 270 and/or volatile memory medium 250 may store instructions that may be executable in accordance with at least a portion of one or more systems, flowcharts, one or more methods, and/or one or more processes described herein. In one or more embodiments, processor 220 may execute instructions in accordance with at least a portion of one or more of systems, flowcharts, methods, and/or processes described herein. For example, non-volatile memory medium 270 and/or volatile memory medium 250 may store instructions that may be executable in accordance with at least a portion of one or more systems, one or more flowcharts, one or more methods, and/or one or more processes described herein. In one or more embodiments, processor 220 may utilize EC data 277. In one example, processor 220 may utilize EC data 277 via non-volatile memory medium 270. In another example, one or more portions of EC data 277 may be transferred to volatile memory medium 250, and processor 220 may utilize EC data 277 via volatile memory medium 250.

Turning now to FIG. 3A, an example of gaze tracking vectors associated with a display is illustrated, according to one or more embodiments. As shown, gaze tracking vectors 320A-320D may be associated with a display 310. In one example, display 310 may be coupled to IHS 110. In another example, IHS 110 may include display 310. In one or more embodiments, gaze tracking vectors 320A-320D may represent that a user is reading information displayed via display 310. For example, gaze tracking vectors 320A-320D may be utilized in determining a reading pattern.

Turning now to FIG. 3B, an example of gaze tracking vectors associated with multiple displays is illustrated, according to one or more embodiments. As shown, gaze tracking vectors 320A-320D may be associated with a display 310A. As illustrated, gaze tracking vectors 320E-320H may be associated with a display 310B. In one example, at least one of displays 310A and 310B may be coupled to IHS 110. In another example, IHS 110 may include at least one of displays 310A and 310B. In one or more embodiments, gaze tracking vectors 320A-320H may represent that a user is reading information displayed via displays 310A and 310B. In one or more embodiments, gaze tracking vectors 320A-320H may represent that a user is comparing information displayed via displays 310A and 310B. For example, gaze tracking vectors 320A-320H may be utilized in determining a reference pattern. Although FIG. 3B illustrates two displays, gaze tracking vectors 320A-320D may be associated with a first window, and gaze tracking vectors 320E-320H may be associated with a second window, according to one or more embodiments. For example, although not specifically illustrated, a single display 310 may display the first window and may display the second window.

Figure 3C:
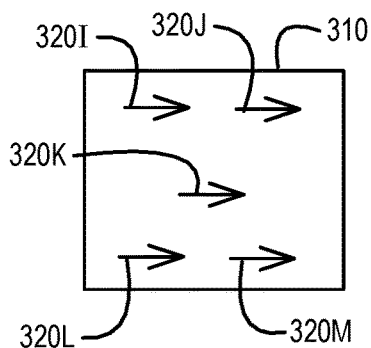
FIG. 3C illustrates a second example of gaze tracking vectors associated with a display, according to one or more embodiments.

Turning now to FIG. 3C, a second example of gaze tracking vectors associated with a display is illustrated, according to one or more embodiments. As shown, gaze tracking vectors 320I-320M may be associated with display 310. In one or more embodiments, gaze tracking vectors 320I-320M may represent that a user is skipping through information displayed via display 310. For example, gaze tracking vectors 320I-320M may represent that a user is skipping through text displayed via display 310. In one instance, gaze tracking vectors 320I-320M may be utilized in determining a browsing pattern. In another instance, gaze tracking vectors 320I-320M may be utilized in determining a skimming pattern.

Figure 3D:
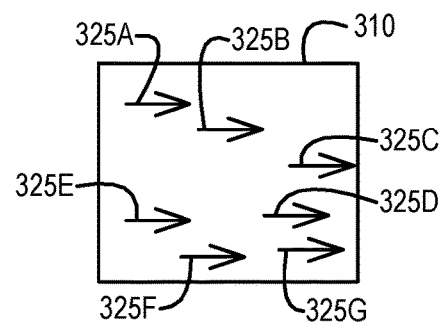
FIG. 3D illustrates a third example of gaze tracking vectors associated with a display, according to one or more embodiments.

Turning now to FIG. 3D, a third example of gaze tracking vectors associated with a display is illustrated, according to one or more embodiments. As shown, gaze tracking vectors 325A-325G may be associated with display 310. In one or more embodiments, gaze tracking vectors 325A-325G may represent that a user is searching for information displayed via display 310. For example, gaze tracking vectors 325A-325G may represent that a user is searching for content displayed via display 310. For instance, gaze tracking vectors 325A-325G may be utilized in determining a chaotic search pattern. For instance, gaze tracking vectors 325A-325G may be temporally ordered. In one or more embodiments, gaze tracking vectors 325A-325G may be respectively associated with times $T_1$-$T_7$. For example, time $T_1$-$T_7$ may be ordered as $T_1<T_2<T_3<T_4<T_5<T_6<T_7$.

Figure 3E:
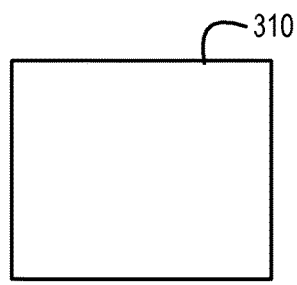
FIG. 3E illustrates an example of no gaze tracking vector and no gaze tracking point associated with a display, according to one or more embodiments.

Turning now to FIG. 3E, an example of no gaze tracking vector and no gaze tracking point associated with a display is illustrated, according to one or more embodiments. As shown, no gaze tracking vector and no gaze tracking point may be associated with display 310. In one or more embodiments, when no gaze tracking vector and no gaze tracking point is associated with display 310, an inattentive pattern may be determined.

Figure 3F:
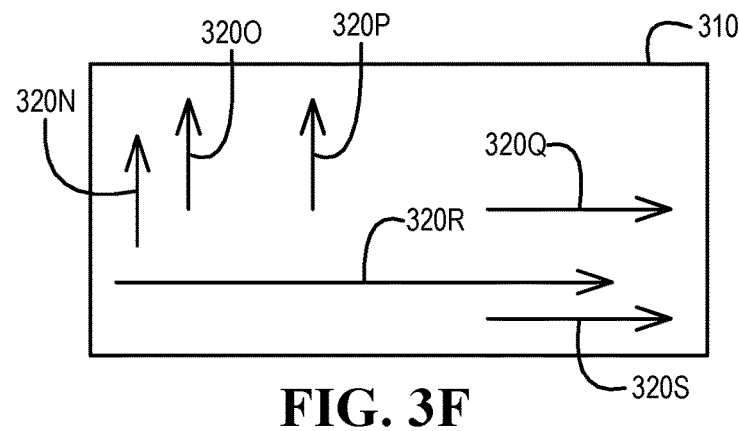
FIG. 3F illustrates a fourth example of gaze tracking vectors associated with a display, according to one or more embodiments.

Turning now to FIG. 3F, a fourth example of gaze tracking vectors associated with a display is illustrated, according to one or more embodiments. As shown, gaze tracking vectors 320N-320S may be associated with display 310. In one or more embodiments, gaze tracking vectors 320N-320S may represent that a user is utilizing one or more tool bars, which may be located on one or more sides of an application widow. In one example, the one or more sides of the application widow may include a vertical side. In another example, the one or more sides of the application widow may include a horizontal side. In one or more embodiments, gaze tracking vectors 320N-320S may be utilized in determining a productivity pattern.

Figure 3G:
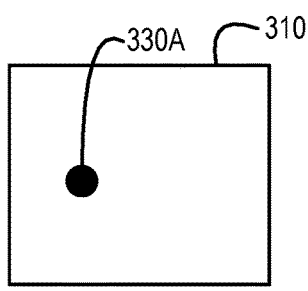
FIG. 3G illustrates an example of a single gaze tracking point associated with a display, according to one or more embodiments.

Turning now to FIG. 3G, an example of a single gaze tracking point associated with a display is illustrated, according to one or more embodiments. As shown, a gaze tracking point 330A may be associated with display 310. In one or more embodiments, gaze tracking point 330A may represent that a user is focused. For example, gaze tracking point 330H may be utilized in determining that the user is thinking. In one or more embodiments, gaze tracking point 330H may be utilized in determining a static pattern.

Figure 3H:
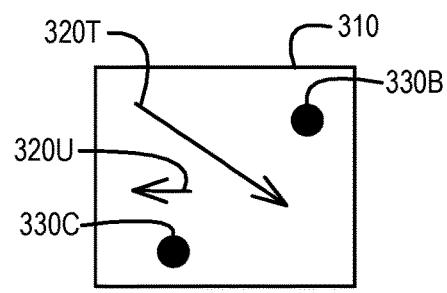
FIG. 3H illustrates an example of gaze tracking vectors and gaze tracking points associated with a display, according to one or more embodiments.

Turning now to FIG. 3H, an example of gaze tracking vectors and gaze tracking points associated with a display is illustrated, according to one or more embodiments. As shown, gaze tracking vectors 320T and 320U and gaze tracking points 330B and 330C may be associated with display 310. In one or more embodiments, gaze tracking vectors 320T and 320U and gaze tracking points 330B and 330C may be utilized in determining that a pattern may not be determined. For example, gaze tracking vectors 320T and 320U and gaze tracking points 330B and 330C may be utilized in determining that a pattern is unknown.

Although the examples of gaze tracking vectors illustrated are associated with a right-left-language (e.g., English), other directions associated with other language may be utilized, according to one or more embodiments. In one example, the other language may be a left-to-right language (e.g., Hebrew). In another example, the other language may be a top-to-bottom language.

Figure 4:
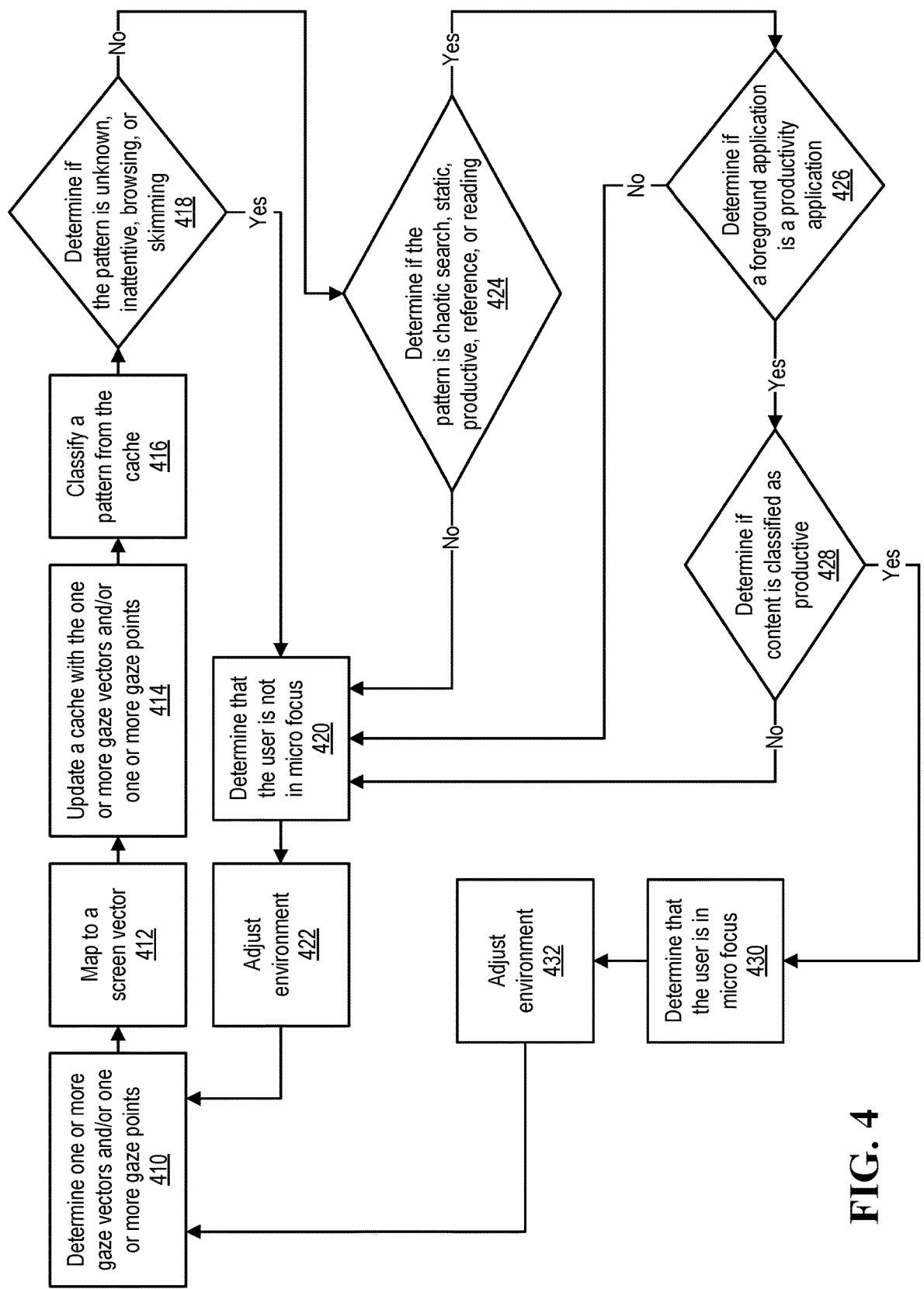
FIG. 4 illustrates an example of a method of adjusting an environment associated with a user, according to one or more embodiments.

Turning now to FIG. 4, an example of a method of adjusting an environment associated with a user is illustrated, according to one or more embodiments. At 410, one or more gaze vectors and/or one or more gaze points may be determined. For example, one or more of gaze vectors 320A-320U, one or more gaze vectors 325A-325G, and/or one or more of gaze points 330A-330C may be determined. In one or more embodiments, a gaze vector may include a direction and a magnitude. In one or more embodiments, a gaze vector may include one or more of an origin and a destination, among others. For example, a gaze vector may include an origin $(X_1, Y_1)$ and/or may include a destination $(X_2, Y_2)$. In one or more embodiments, a gaze point may be a gaze vector with a same origin and destination. For example, a gaze point may be a gaze vector that includes an origin $(X_1, Y_1)$ and a destination $(X_1, Y_1)$.

At 412, one or more vectors determined by an eye tracking device may be mapped to one or more gaze vectors. For example, the one or more vectors determined by the eye tracking device may be associated with a first coordinate system, and the one or more gaze vectors may be associated with a second coordinate system. For instance, the first coordinate system may include an origin associated with the eye tracking device, and the second coordinate system may include an origin associated with a display (e.g., a display 310). In one or more embodiments, mapping the one or more vectors determined by the eye tracking device to the one or more gaze vectors may include scaling. For example, a vector in the first coordinate system may be scaled by a number to be a vector in the second coordinate system. In one or more embodiments, mapping the one or more vectors determined by the eye tracking device to the one or more gaze vectors may include translating. For example, a vector in the first coordinate system may be translated to be a vector in the second coordinate system. In one or more embodiments, mapping the one or more vectors determined by the eye tracking device to the one or more gaze vectors may include rotating. For example, a vector in the first coordinate system may be rotated to be a vector in the second coordinate system. In one or more embodiments, the eye tracking device may be coupled to IHS 110. For example, the eye tracking device may be coupled to at least one processor of IHS 110. For instance, the eye tracking device may be coupled to processor 120.

At 414, a cache may be updated with the one or more gaze vectors and/or the one or more gaze points. In one or more embodiments, the cached may be stored via a memory medium described herein. In one or more embodiments, the cache may be utilized in determining an average gaze direction. For example, the cache may be updated with the one or more gaze vectors and/or the one or more gaze points over a period of time.

At 416, a pattern from the cache may be classified. In one or more embodiments, classifying a pattern from the cache may include determining a pattern based at least on the one or more gaze vectors and/or the one or more gaze points. For example, an artificial intelligence may determine a pattern based at least on the one or more gaze vectors and/or the one or more gaze points. For instance, the artificial intelligence may determine a pattern based at least on a model (e.g., an artificial intelligence model) and based at least on the one or more gaze vectors and/or the one or more gaze points.

At 418, it may be determined if the pattern is unknown, inattentive, browsing, or skimming. Although patterns of unknown, inattentive, browsing, and skimming are utilized at 418, other one or more patterns may be utilized, according to one or more embodiments. If the pattern is unknown, inattentive, browsing, or skimming, it may be determined that the user is not in micro focus, at 420. At 422, an environment associated with the user may be adjusted. In one or more embodiments, the environment associated with the user may be adjusted to allow one or more notifications. For example, the one or more notifications may include one or more electronic mail (email) notifications, one or more text message notifications (e.g., invitations to exchange text messages via a text messaging application), and/or one or more search notifications (e.g., a search engine notification indicating a new update that matches a search pattern), among others.

In one or more embodiments, the environment associated with the user may be adjusted to indicate that the user may be interrupted. For example, a green light may be emitted to indicate that the user may be interrupted. In one instance, a green light near or on a door of an office of the user may be illuminated. In a second instance, a green light near or on an entrance of a cubicle of the user may be illuminated. In another instance, a green light near or on headset of the user may be illuminated.

If the pattern is not unknown, inattentive, browsing, or skimming, it may be determined if the pattern is chaotic search, static, productive, reference, or reading, at 424. Although patterns of chaotic search, static, productive, reference, and reading are utilized at 424, other one or more patterns may be utilized, according to one or more embodiments. If the pattern is not chaotic search, static, productive, reference, or reading, the method may proceed to 420, according to one or more embodiments. If the pattern is chaotic search, static, productive, reference, or reading, it may be determined if a foreground application is a productivity application, at 426.

If the foreground application not is a productivity application, the method may proceed to 420, according to one or more embodiments. If the foreground application is a productivity application, it may be determined if content is classified as productive, at 428. If the content is not classified as productive, the method may proceed to 420, according to one or more embodiments. If the content is classified as productive, it may be determined that the user is in micro focus, at 430. At 432, an environment of the user may be adjusted. In one or more embodiments, the method may proceed to 410, according to one or more embodiments.

In one or more embodiments, the environment of the user may be adjusted to withhold one or more notifications. For example, a notification may include one or more of an email notification (e.g., notifying the user of a new email), a text message notification (e.g., from a text messaging application such as a new text message, an invitation to join a text conversation, etc.), and a social network notification (e.g., notifying the user of an associated user posted a new photo, posted a new update, posted a new comment, posted an new entry in a timeline, etc.), among others. In one or more embodiments, one or more notifications may be withheld until the user is no longer in micro focus.

In one or more embodiments, the environment of the user may be adjusted to focus the user. In one example, a window may be transformed into a full screen window. For instance, a window that the user is utilizing when the user is determined to be in micro focus may be expanded to a full screen version of the window. In a second example, other windows may be adjusted, blurred, or removed. For instance, one or more other windows, other than a window that the user is utilizing when the user is determined to be in micro focus, may be adjusted, blurred, or removed. In a third example, a brightness of a window may be increased. For instance, a brightness of a window that the user is utilizing when the user is determined to be in micro focus may be increased. In a fourth example, a brightness of a screen that the user is utilizing may be increased. In another example, a resolution of a window may be increased. For instance, a resolution of text of a window that the user is utilizing when the user is determined to be in micro focus may be increased.

In one or more embodiments, the environment associated with the user may be adjusted to indicate that the user may not be interrupted. For example, a red light may be emitted to indicate that the user may not be interrupted. In one instance, a red light near or on a door of an office of the user may be illuminated. In a second instance, a red light near or on an entrance of a cubicle of the user may be illuminated. In another instance, a red light near or on headset of the user may be illuminated.

In one or more embodiments, the environment associated with the user may be adjusted to aid the user in the micro focus mode. For example, a sound pressure level (SPL) (e.g., an acoustic pressure level) of an information handling system may be lowered to aid the user in the micro focus mode. For instance, IHS 110 may include one or more fans, and a SPL of one or more of the one or more fans of IHS 110 may be lowered. In one or more embodiments, lowering a SPL of a fan of IHS 110 may include lowering a number of revolutions per minute (RPM) of the fan of IHS 110.

In one or more embodiments, adjusting the environment associated with the user to aid the user in the micro focus mode may include increasing a processing power of an information handling system. In one example, more power may be provided to processor 120 of IHS 110. In a second example, a clock speed of processor 120 of IHS 110 may be increased. In another example, one or more additional processors 120 may be utilized with an application that the user is utilizing.

In one or more embodiments, an eye of a user may be tracked via one or more infrared (IR) sensors. In one or more embodiments, an eye of a user may be tracked via one or more cameras. For example, a camera may include one or more image sensors. In one or more embodiments, light may be reflected from an eye of a user. In one example, the light may be in an IR light spectrum. In another example, the light may be in a visible light spectrum. In one or more embodiments, one or more sensors may determine data, based at least on the light reflected from the eye of the user, associated with the eye of the user. For example, the data associated with the eye of the user may include information associated with one or more of a presence of the eye of the user, a focus of the eye of the user, an attention of the eye of the user, a position of the eye of the user, and a pupil size of the eye of the user, among others. In one or more embodiments, an eye tracking device may include one or more IR sensors, one or more IR light emitters, and/or one or more cameras, among others. In one or more embodiments, a virtual reality (VR) device may include an eye tracking device. For example, a user may wear the VR device. In one instance, IHS 110 may include the VR device. In another instance, the VR device may be coupled to IHS 110. In one or more embodiments, data associated with the eye of the user may be processed to determine one or more of a behavior of the user, one or more environmental conditions of the user, and/or one or more user interactions with an information handling system, among others.

In one or more embodiments, network traffic may be prioritized based at least on what the user is currently viewing. For example, if the user is viewing a streaming video, incoming network traffic may be prioritized based at least on the user viewing the streaming video. For instance, network traffic may be shaped to give priority to the streaming video over an email client downloading an attachment (e.g., a large attachment). In one or more embodiments, prioritizing the network traffic may aid in keeping the user in focus mode. For example, a focus of viewing the streaming video may not be interrupted based on network traffic associated with other applications and/or with other content.

In one or more embodiments, a user may classify an application as a productivity application. For example, a user may classify a web browser as a productivity application. In one or more embodiments, content of the application may be classified as productivity content. For example, content view by a web browser may or may not be classified as productivity content. In one or more embodiments, an access list may include one or more websites that are classified as productive. In one example, the access list may include one or more domain names. In a second example, the access list may include one or more uniform resource identifiers (URIs). In another example, the access list may include one or more uniform resource locators (URLs). In one or more embodiments, the access list may be considered a "white list" of one or more productivity contents.

In one or more embodiments, a base artificial intelligence model may be utilized. In one or more embodiments, one or more new artificial intelligence models may be trained. For example, the one or more new artificial intelligence models may augment the base artificial intelligence model. For instance, the one or more new artificial intelligence models may be trained with additionally collected data as a user continues to utilize a system.

Turning now to FIG. 5A, a method of calibrating a service is illustrated, according to one or more embodiments. At 510, a configuration policy may be loaded. For example, OS 162 may load a configuration policy. For instance, a service of OS 162 may load a configuration policy. In one or more embodiments, the configuration policy may be loaded from a non-volatile memory medium. In one or more embodiments, the configuration policy may be loaded from a network.

At 512, the configuration policy may be stored. For example, EC 185 may store the configuration policy. In one or more embodiments, the configuration policy may be stored via a non-volatile memory medium. For example, EC 185 may store the configuration policy via non-volatile memory medium 270. For instance, EC 185 may store the configuration policy via EC data 277. In one or more embodiments, utilizing non-volatile memory medium 270 to store the configuration policy may be advantageous. In one example, the configuration policy may persist through one or more boot-ups of IHS 110. In another example, the configuration policy may persist through one or more operating system installations of IHS 110. In one or more embodiments, EC 185 and OS 162 may communicate information via a management information exchange. For example, EC 185 and OS 162 may communicate information via a management information exchange via one or more of a WMI and a CIM, among others.

At 514, the configuration policy may be utilized to determine one or more actions. For example, EC 185 may utilize the configuration policy to determine one or more actions. At 516, contextual input information may be collected and time stamped. For example, OS 162 may collect and time stamp contextual input information. For instance, a service of OS 162 may collect and time stamp contextual input information.

In one example, the contextual input information may include a physical location. In one instance, the physical location may be indoors. In another instance, the physical location may be outdoors. In a second example, the contextual input information may include a number of displays of a workspace configuration. In a third example, the contextual input information may include information associated with a display. In one instance, the information associated with a display may include a resolution setting of the display. In a second instance, the information associated with a display may include dimensions of the display. In a third instance, the information associated with a display may include information that indicates that the display is internal to an information handling system or indicates that the display is external to an information handling system.

In a forth example, the contextual input information may include information that indicates a hinge angle. In a fifth example, the contextual input information may include information that indicates a posture. In one instance, the posture may include a portrait posture. In a second instance, the posture may include a landscape posture. In another instance, the posture may include "tablet posture" or a "360° posture". In a sixth example, the contextual input information may include information that may identify one or more applications with one or more open windows.

In a seventh example, the contextual input information may include information that indicates one or more positions of one or more windows. For instance, information that indicates a position of a window may include a horizontal offset and a vertical offset. A horizontal offset or a vertical offset may be expressed in pixels. In an eighth example, the contextual input information may include information that indicates an application. In one instance, an application that has "focus" may be an application that receives user input. In another instance, an application that has "focus" may be an application that has a window that is on top of any other window on a display. In a ninth example, the contextual input information may include information that indicates one or more services and/or one or more processes, among others.

In a tenth example, the contextual input information may include information that indicates a time of day. In an eleventh example, the contextual input information may include information that indicates operating system settings. In a twelfth example, the contextual input information may include information that indicates an ambient light measurement. For instance, the workspace configuration may include a light sensor that may measure one or more amounts of light and provide digital data that represents the one or more amounts of light.

At 518, an AI model may be trained. For example, the AI model may be trained with the contextual input information. In one or more embodiments, OS 162 may train the AI model. For example, IHS 110 may train the AI model. In one or more embodiments, a cloud-based computational solution may train the AI model. For example, IHS 110 may provide the contextual input information to the cloud-based computational solution via a network.

At 520, the configuration policy may be updated based at least on the trained AI model. In one example, OS 162 may update the configuration policy based at least on the trained AI model. In another example, EC 185 may update the configuration policy based at least on the trained AI model. At 522, the configuration policy may be stored. For example, EC 185 may store the configuration policy. In one or more embodiments, the configuration policy may be stored via a non-volatile memory medium. For example, EC 185 may store the configuration policy via non-volatile memory medium 270. For instance, EC 185 may store the configuration policy via EC data 277.

Turning now to FIG. 5B, a method of utilizing a service is illustrated, according to one or more embodiments. At 530, contextual information may be monitored and time stamped. For example, OS 162 may monitor and time stamp contextual information. For instance, a service of 162 may monitor and time stamp contextual information. At 532, the contextual information may be stored. For example, OS 162 may store the contextual information. For instance, a service of OS 162 may store the contextual information.

At 534, learned events may be monitored. For example, OS 162 may monitor for learned events. For instance, a service of OS 162 may monitor for learned events. In one or more embodiments, monitoring for learned event may include processing the contextual information via the AI model that was trained at 518 (illustrated in FIG. 5A). In one or more embodiments, monitoring for learned event may include processing the contextual information via the configuration policy that was updated based at least on the AI model that was trained at 518 (illustrated in FIG. 5A). For example, the configuration policy was updated based at least on the AI model at 520 (illustrated in FIG. 5A).

At 536, a current configuration policy may be utilized to determine one or more actions. For example, EC 185 may utilize a current configuration policy to determine one or more actions. In one or more embodiments, EC 185 may store the current configuration policy. For example, EC 185 may store the current configuration policy via non-volatile memory medium 270. For instance, EC 185 may store the current configuration policy via EC data 277. In one or more embodiments, utilizing the configuration policy may include retrieving the current configuration policy from a non-volatile memory medium. For example, EC 185 may retrieve the current configuration policy from non-volatile memory medium 270. For instance, EC 185 may retrieve the current configuration policy from EC data 277.

At 538, an inference may be applied based at least on the current configuration policy. For example, OS 162 may apply an inference based at least on the current configuration policy. For instance, a service of OS 162 may apply an inference based at least on the current configuration policy. In one or more embodiments, the inference may be an inference from the AI model. In one or more embodiments, the inference may be an inference based at least on the AI model.

Figures 5C, 5D:
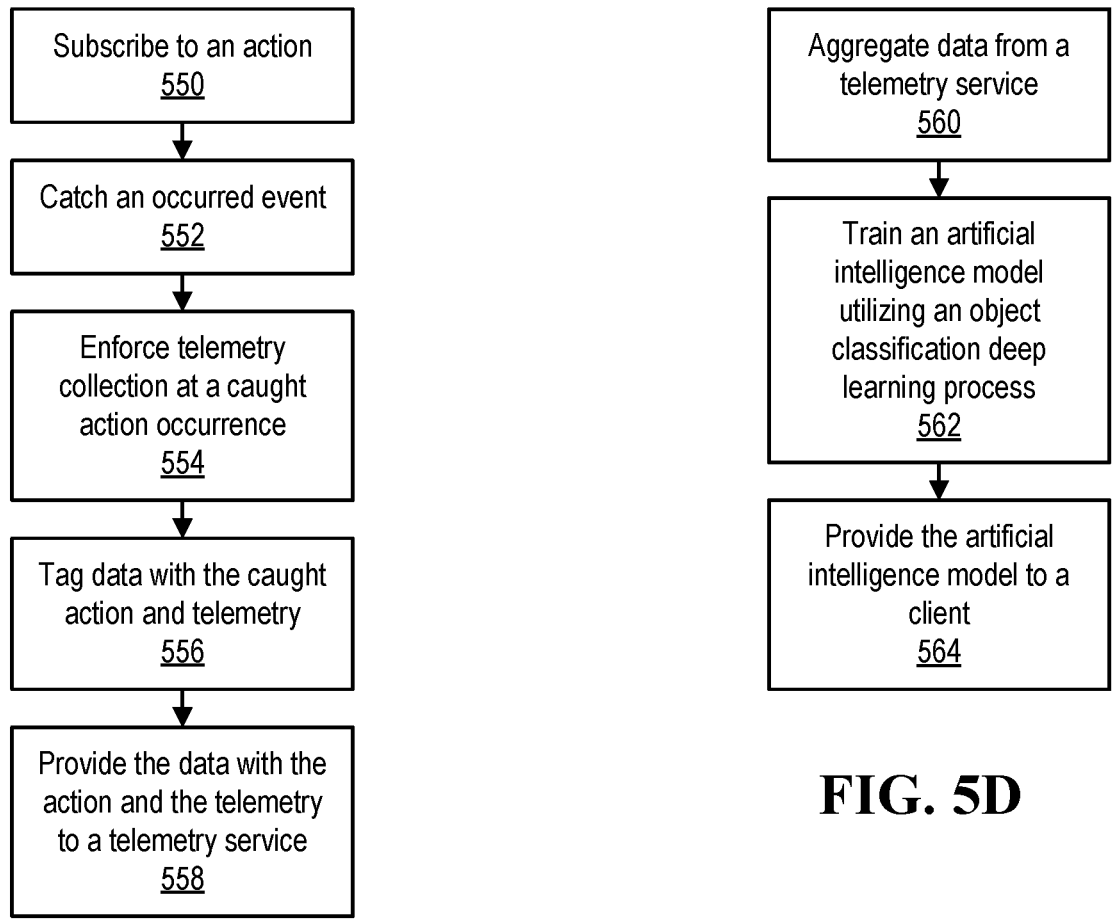
FIG. 5C illustrates a method of calibrating an event based telemetry collection, according to one or more embodiments.
FIG. 5D illustrates a method of providing a classification artificial intelligence to an information handling system, according to one or more embodiments.

Turning now to FIG. 5C, a method of calibrating an event based telemetry collection is illustrated, according to one or more embodiments. At 550, an action may be subscribed to. At 552, an occurred event may be caught. At 554, telemetry collection may be enforced at a caught action occurrence. In one or more embodiments, telemetry collection may include collecting information associated with one or more gaze vectors, information associated with one or more network addresses, information associated with one or more URIs, information associated with one or more URLs, and/or information associated with one or more peripherals utilized, among others. At 556, data may be tagged with the caught action and telemetry. At 558, the data with the action and the telemetry may be provided to a telemetry service. For example, the telemetry service may be a service of OS 162.

Turning now to FIG. 5D, a method of providing a classification artificial intelligence to an information handling system is illustrated, according to one or more embodiments. At 560, data from a telemetry service may be aggregated. At 562, an artificial intelligence model may be trained utilizing an object classification deep learning process. In one or more embodiments, the deep learning process may include a convolution neural network (CNN). For example, the artificial intelligence model may include a CNN. For instance, the CNN may be trained to classify objects. In one or more embodiments, the CNN may output one or more probabilities that indicate a confidence of respective one or more classifications. At 564, the artificial intelligence model may be provided to a client. For example, the client may include IHS 110.

Figure 5E:
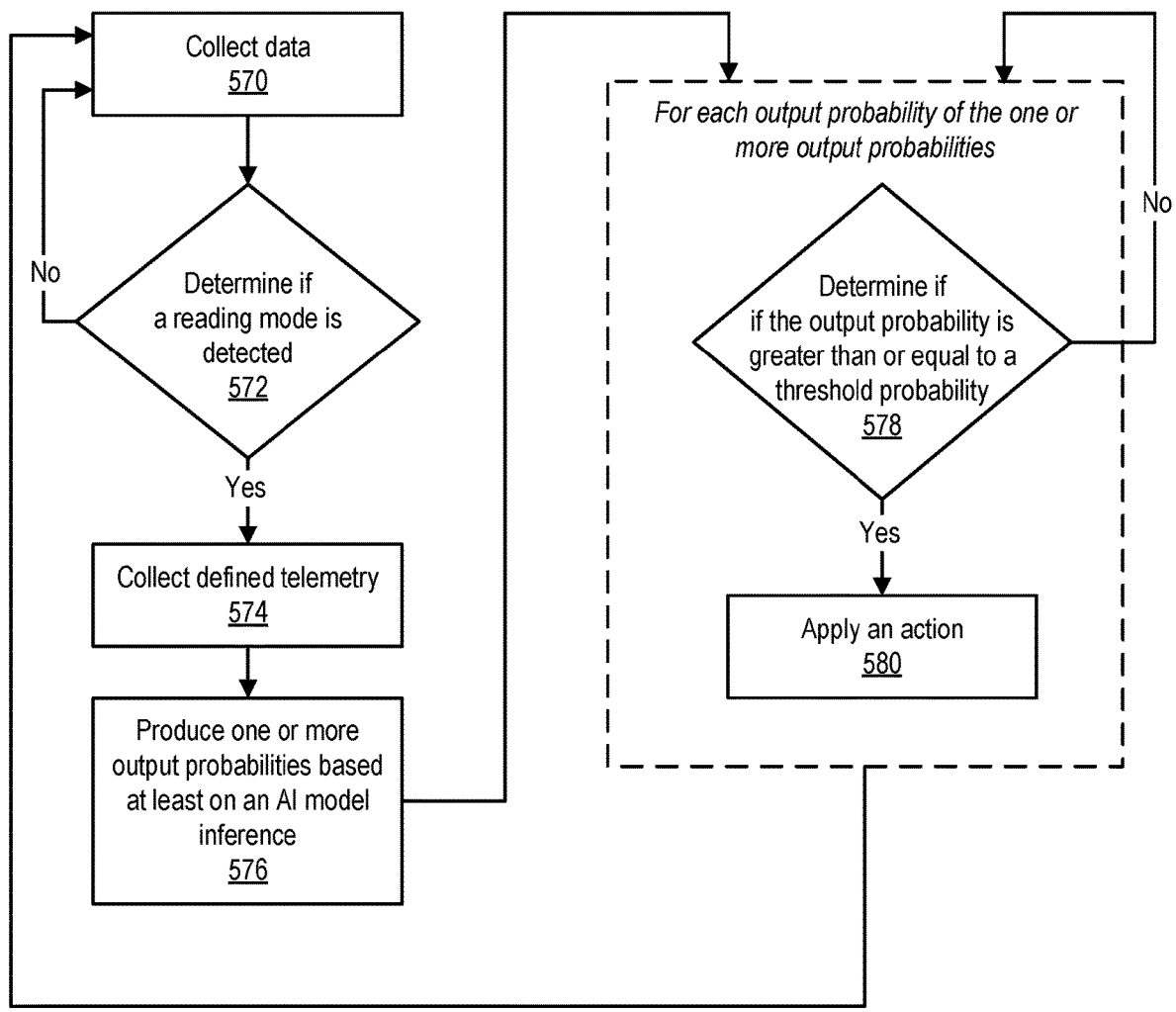
FIG. 5E illustrates a method of utilizing a classification artificial intelligence, according to one or more embodiments

Turning now to FIG. 5E, a method of utilizing a classification artificial intelligence is illustrated, according to one or more embodiments. At 570, data may be collected. In one or more embodiments, the data may include contextual information. At 572, it may be determined if a reading mode is detected. For example, determining if a reading mode is detected may include determining if a user is reading content from a display associated with an information handling system. If the reading mode is not detected, the method may proceed to 570, according to one or more embodiments. If the reading mode is detected, telemetry may be collected, at 574. At 576, one or more output probabilities based at least on an AI model inference may be produced. In one or more embodiments, the one or more output probabilities may indicate a confidence of respective one or more classifications.

For each of output probability of the one or more output probabilities, it may be determined if the output probability is greater than or equal to a threshold probability, at 578. If the output probability is not greater than or equal to the threshold probability, a next output probability may be evaluated. If the output probability is greater than or equal to the threshold probability, an action may be applied at 580. For example, the action may adjust an environment of the user. For instance, the environment of the user may be adjusted in accordance with method element 432 (FIG. 4). In one or more embodiments, a next output probability may be evaluated. If all of the one or more output probabilities have been evaluated, the method may proceed to 570, according to one or more embodiments.

Figure 6:
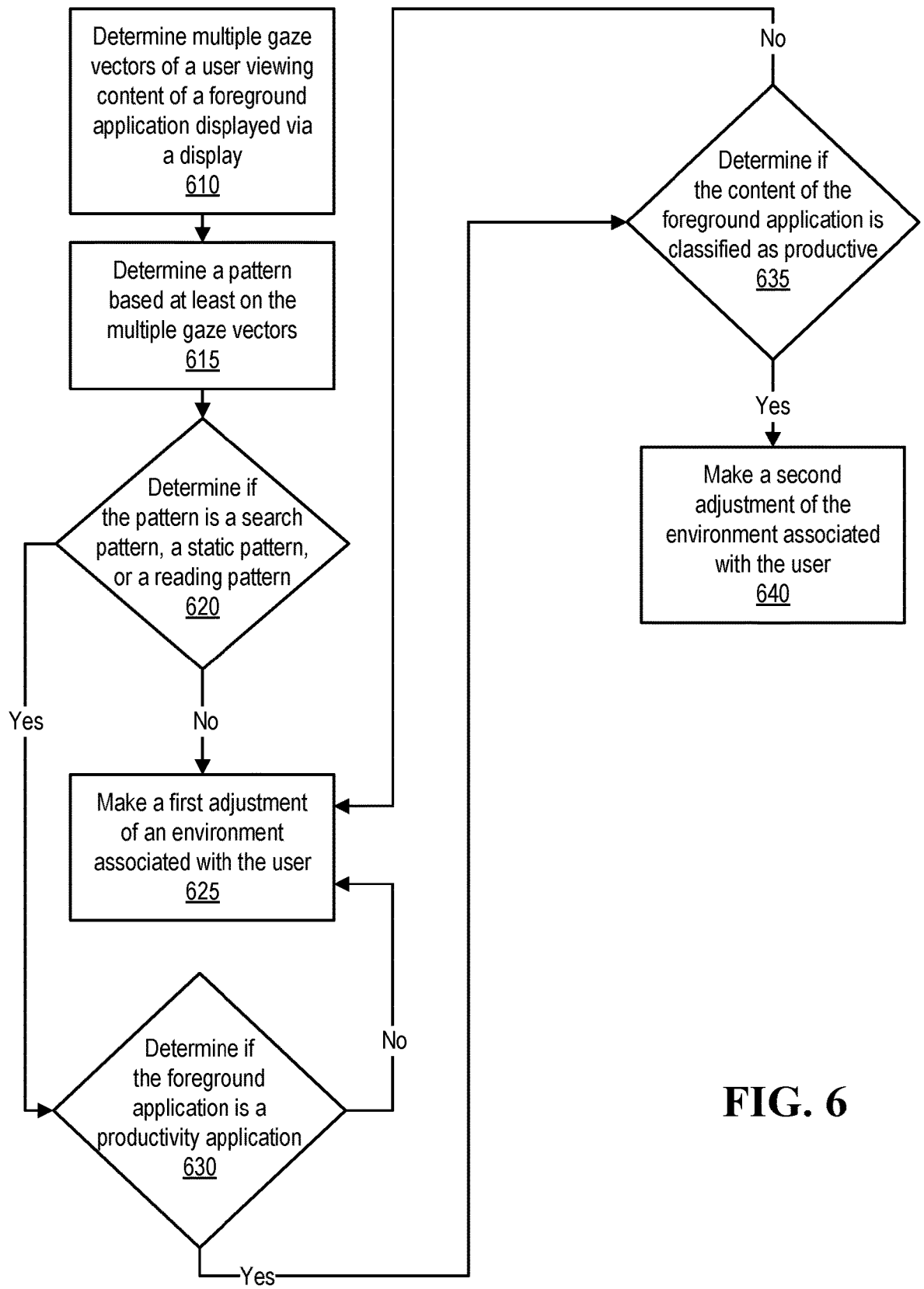
FIG. 6 illustrates another example of a method of adjusting an environment associated with a user, according to one or more embodiments.

Turning now to FIG. 6, another example of a method of adjusting an environment associated with a user is illustrated, according to one or more embodiments. At 610, multiple gaze vectors, of a user viewing content of a foreground application displayed via a display, may be determined. In one or more embodiments, determining the multiple gaze vectors may include an eye tracking device determining multiple movements of an eye of the user. For example, the multiple gaze vectors may be determined from the multiple movements of the eye of the user. In one or more embodiments, the eye tracking device may include one or more IR light emitters that may emit IR light emissions. For example, the eye tracking device may include one or more IR light sensors that may receive reflected IR light emissions from an eye of the user. For instance, the eye tracking device may determine one or movements of the eye of the user based at least on the reflected IR light emissions from the eye of the user. In one or more embodiments, the eye tracking device may include one or more cameras. For example, a camera may include one or more image sensors. For instance, the eye tracking device may determine one or movements of the eye of the user based at least on one or more images of the eye of the user. In one or more embodiments, the eye tracking device may be coupled to IHS 110. In one or more embodiments, IHS 110 may include the eye tracking device.

At 615, a pattern may be determined based at least on the multiple gaze vectors. In one or more embodiments, determining the pattern based at least on the multiple gaze vectors may include an artificial intelligence model determining the pattern based at least on the multiple gaze vectors. In one example, the artificial intelligence model may include a neural network. In another example, the artificial intelligence model may include a machine learning model. In one or more embodiments, the machine learning model may be utilized to determine the pattern without using receiving explicit instructions. For example, the machine learning model may have been trained, from training data, to produce one or more predictions and/or one or more decisions without being explicitly programmed to do so. For instance, the one or more predictions and/or the one or more decisions may include the pattern. In one or more embodiments, utilizing the machine learning model to determine the pattern may be advantageous. For example, it may be difficult or it may even be infeasible to develop a conventional method or process to effectively determine a pattern from multiple gaze vectors of a user viewing content of a foreground application displayed via a display.

At 620, it may be determined if the pattern is a search pattern, a static pattern, or a reading pattern. In one or more embodiments, determining if the pattern is the search pattern, the static pattern, or the reading pattern may include an artificial intelligence model providing at least one output probability. For example, the artificial intelligence model may provide at least one of an output probability associated with the search pattern, an output probability associated with the static pattern, and an output probability associated with the reading pattern, among others. In one or more embodiments, it may be determined that the at least one output probability is greater than or equal to a threshold probability. For example, it may be determined that at least one of the output probability associated with the search pattern, the output probability associated with the static pattern, and the output probability associated with the reading pattern, among others, is greater than or equal to the threshold probability. For instance, determining that at least one of the output probability associated with the search pattern, the output probability associated with the static pattern, and the output probability associated with the reading pattern, among others, is greater than or equal to the threshold probability may indicate that the pattern is the search pattern, the static pattern, or the reading pattern.

If the pattern is not the search pattern, the static pattern, or the reading pattern, a first adjustment of an environment associated with the user may be made, at 625. In one or more embodiments, making the first adjustment of the environment associated with the user may include adjusting the environment associated with the user to allow one or more notifications. For example, the one or more notifications may include one or more email notifications, one or more text message notifications (e.g., invitations to exchange text messages via a text messaging application), and/or one or more search notifications (e.g., a search engine notification indicating a new update that matches a search pattern), among others. In one or more embodiments, making the first adjustment of the environment associated with the user may include adjusting the environment associated with the user to indicate that the user may be interrupted. For example, green light emissions may be emitted to indicate that the user may be interrupted. In one instance, a green light near or on a door of an office of the user may be illuminated, which may provide the green light emissions. In a second instance, a green light near or on an entrance of a cubicle of the user may be illuminated, which may provide the green light emissions. In another instance, a green light near or on headset of the user may be illuminated, which may provide the green light emissions.

If the pattern is the search pattern, the static pattern, or the reading pattern, it may be determined if the foreground application is a productivity application, at 630. If the foreground application is not the productivity application, the first adjustment of the environment associated with the user may be made, at 625. If the foreground application is the productivity application, it may be determined if the content of the foreground application is classified as productive, at 635. If the content of the foreground application is not classified as productive, the first adjustment of the environment associated with the user may be made, at 625. If the content of the foreground application is classified as productive, a second adjustment of the environment associated with the user may be made, at 640.

In one or more embodiments, making the second adjustment of the environment associated with the user may include adjusting the environment associated with the user to withhold one or more notifications. For example, a notification may include one or more of an email notification (e.g., notifying the user of a new email), a text message notification (e.g., from a text messaging application such as a new text message, an invitation to join a text conversation, etc.), and a social network notification (e.g., notifying the user of an associated user posted a new photo, posted a new update, posted a new comment, posted an new entry in a timeline, etc.), among others.

In one or more embodiments, making the second adjustment of the environment associated with the user may include adjusting the environment associated with the user to focus the user. In one example, a window may be transformed into a full screen window, which may focus the user on the window. For instance, the window that the user is utilizing may be expanded to a full screen version of the window. In a second example, other windows may be adjusted, blurred, or removed. For instance, one or more other windows, other than the window that the user is utilizing, may be adjusted, blurred, or removed. In a third example, a brightness of the window may be increased. For instance, a brightness of the window that the user is utilizing may be increased. In a fourth example, a brightness of a screen that the user is utilizing may be increased. In another example, a resolution of the window may be increased. For instance, a resolution of text of the window that the user is utilizing may be increased.

In one or more embodiments, making the second adjustment of the environment associated with the user may include adjusting the environment associated with the user to indicate that the user may not be interrupted. For example, red light emissions may be emitted to indicate that the user may not be interrupted. In one instance, a red light near or on a door of an office of the user may be illuminated, which may provide the red light emissions. In a second instance, a red light near or on an entrance of a cubicle of the user may be illuminated, which may provide the red light emissions. In another instance, a red light near or on headset of the user may be illuminated, which may provide the red light emissions.

In one or more embodiments, making the second adjustment of the environment associated with the user may include adjusting the environment associated with the user to aid the user. For example, a SPL of an information handling system may be lowered to aid the user. For instance, IHS 110 may include one or more fans, and a SPL of one or more of the one or more fans of IHS 110 may be lowered. In one or more embodiments, lowering a SPL of a fan of IHS 110 may include lowering a number of revolutions per minute of the fan of IHS 110.

In one or more embodiments, making the second adjustment of the environment associated with the user may include adjusting the environment associated with the user to aid the user may include increasing a processing power of an information handling system. In one example, more power may be provided to processor 120 of IHS 110. In another example, one or more additional processors 120 may be utilized with an application that the user is utilizing.

In one or more embodiments, it may be determined that the user is in a micro focus session if the content of the foreground application is classified as productive. For example, making the second adjustment of the environment associated with the user may be performed in response to determining that the user is in the micro focus session. In one or more embodiments, making the second adjustment of the environment associated with the user may be performed in response to determining that the at least one output probability is greater than or equal to the threshold probability.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor; and
   a memory medium, coupled to the at least one processor, that stores instructions executable by the at least one processor, which when executed by the at least one processor, cause the information handling system to:
      determine a plurality of gaze vectors of a user viewing content of a foreground application displayed via a display;
      determine a pattern based at least on the plurality of gaze vectors;
      determine if the pattern is a search pattern, a static pattern, or a reading pattern;
      if the pattern is the search pattern, the static pattern, or the reading pattern, determine if the foreground application is a productivity application;
      if the foreground application is the productivity application, determine if the content of the foreground application is classified as productive;
      if the pattern is not the search pattern, the static pattern, or the reading pattern; if the foreground application is not the productivity application; or if the content of the foreground application is not classified as productive, make a first adjustment of an environment associated with the user; and
      if the content of the foreground application is classified as productive, make a second adjustment of the environment associated with the user, different from the first adjustment of the environment associated with the user.

2. The information handling system of claim 1,
   wherein the instructions further cause the information handling system to, if the content of the foreground application is classified as productive, determine that the user is in a micro focus session; and
   wherein making the second adjustment of the environment associated with the user is performed in response to determining that the user is in the micro focus session.

3. The information handling system of claim 1, wherein, to make the second adjustment of the environment associated with the user, the instructions further cause the information handling system to suspend notifications to the user.

4. The information handling system of claim 1, wherein, to make the second adjustment of the environment associated with the user, the instructions further cause the information handling system to provide light emissions that indicate that the user is not to be interrupted.

5. The information handling system of claim 1, wherein, to determine the pattern based at least on the plurality of gaze vectors, the instructions further cause the information handling system to utilize an artificial intelligence model to determine the pattern based at least on the plurality of gaze vectors.

6. The information handling system of claim 1, further comprising:
   an artificial intelligence model configured to provide at least one output probability;
   wherein the instructions further cause the information handling system to determine that the at least one output probability is greater than or equal to a threshold probability; and
   wherein making the second adjustment of the environment associated with the user is performed in response to determining that the at least one output probability is greater than or equal to the threshold probability.

7. The information handling system of claim 1, further comprising:
   an eye tracking device coupled to the at least on processor and configured to track a plurality of movements of an eye of the user;
   wherein, to determine the plurality of gaze vectors, the instructions further cause the information handling system to utilize the eye tracking device to track the plurality of movements of the eye of the user.

8. A method, comprising:
   determining a plurality of gaze vectors of a user viewing content of a foreground application displayed via a display;
   determining a pattern based at least on the plurality of gaze vectors;
   determining if the pattern is a search pattern, a static pattern, or a reading pattern;
   if the pattern is the search pattern, the static pattern, or the reading pattern, determining if the foreground application is a productivity application;
   if the foreground application is the productivity application, determining if the content of the foreground application is classified as productive;
   if the pattern is not the search pattern, the static pattern, or the reading pattern; if the foreground application is not the productivity application; or if the content of the foreground application is not classified as productive, making a first adjustment of an environment associated with the user; and
   if the content of the foreground application is classified as productive, making a second adjustment of the environment associated with the user, different from the first adjustment of the environment associated with the user.

9. The method of claim 8, further comprising:
   if the content of the foreground application is classified as productive, determining that the user is in a micro focus session;
   wherein the making the second adjustment of the environment associated with the user is performed in response to the determining that the user is in the micro focus session.

10. The method of claim 8, wherein the making the second adjustment of the environment associated with the user includes suspending notifications to the user.

11. The method of claim 8, wherein the making the second adjustment of the environment associated with the user includes providing light emissions that indicate that the user is not to be interrupted.

12. The method of claim 8, wherein the determining the pattern based at least on the plurality of gaze vectors includes an artificial intelligence model determining the pattern based at least on the plurality of gaze vectors.

13. The method of claim 8, further comprising:
   an artificial intelligence model providing at least one output probability; and
   determining that the at least one output probability is greater than or equal to a threshold probability;

wherein the making the second adjustment of the environment associated with the user is performed in response to the determining that the at least one output probability is greater than or equal to the threshold probability.

14. The method of claim 8, wherein the determining the plurality of gaze vectors includes an eye tracking device tracking a plurality of movements of an eye of the user.

15. A computer-readable non-transitory memory medium that includes instructions that, when executed by at least one processor of an information handling system, cause the information handling system to:
- determine a plurality of gaze vectors of a user viewing content of a foreground application displayed via a display;
- determine a pattern based at least on the plurality of gaze vectors;
- determine if the pattern is a search pattern, a static pattern, or a reading pattern;
- if the pattern is the search pattern, the static pattern, or the reading pattern, determine if the foreground application is a productivity application;
- if the foreground application is the productivity application, determine if the content of the foreground application is classified as productive;
- if the pattern is not the search pattern, the static pattern, or the reading pattern; if the foreground application is not the productivity application; or if the content of the foreground application is not classified as productive, make a first adjustment of an environment associated with the user; and
- if the content of the foreground application is classified as productive, make a second adjustment of the environment associated with the user, different from the first adjustment of the environment associated with the user.

16. The computer-readable non-transitory memory medium of claim 15,
- wherein the instructions further cause the information handling system to, if the content of the foreground application is classified as productive, determine that the user is in a micro focus session; and
- wherein making the second adjustment of the environment associated with the user is performed in response to determining that the user is in the micro focus session.

17. The computer-readable non-transitory memory medium of claim 15, wherein, to make the second adjustment of the environment associated with the user, the instructions further cause the information handling system to suspend notifications to the user.

18. The computer-readable non-transitory memory medium of claim 15, wherein, to make the second adjustment of the environment associated with the user, the instructions further cause the information handling system to provide light emissions that indicate that the user is not to be interrupted.

19. The computer-readable non-transitory memory medium of claim 15, wherein, to determine the pattern based at least on the plurality of gaze vectors includes an artificial intelligence model, the instructions further cause the information handling system to determine the pattern based at least on the plurality of gaze vectors.

20. The computer-readable non-transitory memory medium of claim 15,
- wherein the information handling system includes an artificial intelligence model that is configured to provide at least one output probability;
- wherein the instructions further cause the information handling system to determine that the at least one output probability is greater than or equal to a threshold probability; and
- wherein making the second adjustment of the environment associated with the user is performed in response to determining that the at least one output probability is greater than or equal to the threshold probability.

* * * * *